United States Patent
Heor et al.

(10) Patent No.: US 7,450,487 B2
(45) Date of Patent: Nov. 11, 2008

(54) OPTICAL PICKUP APPARATUS

(75) Inventors: Tae-youn Heor, Suwon-si (KR);
Tae-yun Kim, Suwon-si (KR);
Jung-woo Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 645 days.

(21) Appl. No.: 11/146,189

(22) Filed: Jun. 7, 2005

(65) Prior Publication Data

US 2005/0276203 A1 Dec. 15, 2005

(30) Foreign Application Priority Data

Jun. 11, 2004 (KR) .................. 10-2004-0043125

(51) Int. Cl.
*G11B 7/00* (2006.01)

(52) U.S. Cl. .................. 369/112.02; 369/44.23; 369/44.41

(58) Field of Classification Search ............. 369/112.02
See application file for complete search history.

(56) References Cited

U.S. PATENT DOCUMENTS

| | | | | |
|---|---|---|---|---|
| 4,904,063 | A | * | 2/1990 | Okada et al. ............. 359/742 |
| 5,594,713 | A | * | 1/1997 | Komma et al. ........... 369/44.23 |
| 6,664,998 | B1 | | 12/2003 | Kyoya et al. |
| 2002/0036958 | A1 | * | 3/2002 | Wada et al. ............. 369/44.23 |
| 2003/0053394 | A1 | | 3/2003 | Park et al. |

FOREIGN PATENT DOCUMENTS

| | | |
|---|---|---|
| EP | 1 341 166 | 9/2003 |
| JP | 05100201 A * | 4/1993 |
| JP | 09282684 A * | 10/1997 |
| JP | 2004-111012 | 4/2004 |

OTHER PUBLICATIONS

Yi sun, et al., "Development of Liquid Crystal Adaptive Lens with Circular Electrodes for Imaging Application", Integrated Optics: Devices, Materials, and Technologies VII, Proceedings of SPIE vol. 4987 (2003) XP-002375765 (pp. 209-220).

(Continued)

*Primary Examiner*—Jorge L Ortiz Criado
(74) *Attorney, Agent, or Firm*—Staas & Halsey LLP

(57) ABSTRACT

A photo detector for use in an optical pickup apparatus that detects a beam reflected from the disc, and includes a substrate for transmitting one main beam and two sub beams reflected from the optical disc; a liquid crystal for refracting the two sub beams, that are transmitted through the substrate, at different refractive indexes according to the wavelength of a laser beam outputted from the laser diode; an electrode material for supplying power to the liquid crystal; a switch for adjusting the magnitude of an applied voltage to the electrode material; and a photodiode on which the main beam and the refracted sub beams while transmitting the substrate and the liquid crystal are projected, and transformed into electric signals. By refracting the beams refracted from the disc at a proper refractive index, the $\pm 1^{st}$-order beams can be projected onto the same position, irrespective of the wavelengths.

20 Claims, 6 Drawing Sheets

OTHER PUBLICATIONS

M. Hain, et al., "Fast Switching Liquid Crystal Lenses for a Dual Focus Digital Versatile Disc Pickup", Optics Communications 188 (Feb. 15, 2001) pp. 291-299.

European Search Report Communication issued in Application No. 05253509.3-2210 dated Apr. 20, 2006.

Patent Abstracts of Japan for Publication No. 63-241735, dated Oct. 7, 1988.

Patent Abstracts of Japan for Publication No. 06-180851, dated Jun. 28, 1994.

Patent Abstracts of Japan for Publication No. 10-068820, dated Mar. 10, 1998.

Patent Abstracts of Japan for Publication No. 11-066597, dated Mar. 9, 1999.

* cited by examiner

OPTICAL PICKUP APPARATUS

CROSS-REFERENCE TO RELATED APPLICATIONS

This application claims the benefit of Korean Patent Application No. 10-2004-0043125, filed Jun. 11, 2004, in the Korean Intellectual Property Office, the disclosure of which is incorporated herein by reference.

BACKGROUND OF THE INVENTION

1. Field of the Invention

The present invention relates to an optical pickup apparatus, and more particularly, to an optical pickup apparatus, in which the refractive index of a sub beam incident on a light receiving element is adjusted to ensure that the sub beam does not incide on a position deviated from the light receiving element, whereby information can be recorded and/or reproduced onto and/or from discs in various specifications.

2. Description of the Related Art

In general, an optical pickup apparatus is employed in CDPs, DVDPs, CD-ROM drivers, and DVD-ROM drivers, to record and/or reproduce information onto and/or from a non-contact type recording medium.

The DVDP (Digital Versatile Disc Player) and the DVD-ROM are capable of recording and reproducing high-density data so that they are preferably used with video and audio products. In particular, the optical pickup apparatus for use in the DVDP is capable of recording and/or reproducing information on and/or from a DVD and is manufactured to be compatible with a CD family media such as CD, CD-R (Recordable), CD-I (Interactive), and CD-G (Graphics).

However, the thickness of DVDs has been standardized differently from that of the CD family media in consideration of the allowable error in the tilt angle of a disc and the numeral aperture (NA) of an objective lens. That is, the standard thickness of existing CD family media is 1.2 mm, whereas the standard thickness of DVDs is 0.6 mm. As such, when an optical pickup apparatus for DVDs is used for the CD family media, spherical aberrations occur due to the difference in the thickness between these two types of discs. As a result of the spherical aberrations, a sufficient light intensity cannot be provided for recording an information signal or the signal reproduced from the CD is often deteriorated. In addition, the track pitch of a DVD is at least two times denser than a CD, and the space between each land is much narrower, so that the DVD storage capacity is several times larger than the CD storage capacity. Because a CD and a DVD have different thicknesses and storage capacities from each other, wavelengths of laser beams used for the DVD are different from those used for the CD. For instance, the CD uses an infrared ray having a wavelength of 780 nm for recording and/or reproducing information, while the DVD uses a red light beam having a wavelength of 635 nm for the same operation.

As described above, wavelengths of lasers used for the DVD and the CD are different because the DVD and the CD have different thicknesses. Therefore, it is difficult to reproduce information from the DVD and the CD using one optical system. As an attempt to solve this problem, a lens switching method has been developed. According to the lens switching method, two objective lenses, one for the CD and the other for the DVD, are installed. Even though it makes the product design more complicated and increases the cost of manufacture, it is the best known method for use with the DVD and the CD. In effect, Toshiba and Hitachi are still using this method in their products.

Then, there was introduced a new method for reading information from two media at the same time using only one DVD lens. An NA control system and an annular system are typical examples thereof. Since these two systems use only one lens, they are cost effective and simplify the product design. Furthermore, a hologram using two focal points with one DVD lens, or a non-spherical lens corresponding to the NAs of two media can be used also.

Meanwhile, optical pickup apparatuses, depending on the type of a light receiving element used, are divided into optical pickup apparatuses based on a push-pull method using a 4-split light receiving element, and optical pickup apparatuses based on a 3-beam method using an 8-split light receiving element. The 3-beam optical pickup apparatus is generally used for high-density discs where an accurate tracking servo performance is highly desired.

As can be seen in FIG. 1, the 3-beam optical pickup apparatus includes an LD (Laser Diode) 101 for emitting two light beams of different wavelengths; a diffraction grating 102 for splitting a laser beam from the LD 101 into three discrete beams, namely one main beam and two sub beams; a beam splitter 103 for reflecting a beam off of the diffraction grating 102 towards an optical disc and transmitting a reflected beam from the optical disc; a collimator lens 104 for condensing parallel beams reflected from the beam splitter 103 to form a beam spot on an information recording surface of the optical disc, and transforming a divergent beam of the beam spot reflected from the information recording surface of the optical disc to a parallel beam (or collimated beam); an objective lens 105 for condensing the reflected light transmitted through the beam splitter 103, and a photo detector 106 for photoelectrically transforming three beam spots condensed by the objective lens 105 into electric signals.

Depending on whether the information recording medium is a CD or a DVD, the LD 101 of the optical pick up apparatus outputs laser beams having different wavelengths. An outputted laser beam is then split by the diffraction grating 102 into a main beam and sub beams. In other words, the diffraction grating 102 splits the laser beam into an $0^{th}$-order main beam for reading an information signal from the laser beam outputted from the LD 101 and for a focus servo of the optical disc and $\pm 1^{st}$-order sub beams for a track servo of the optical disc.

The split beams are reflected towards the optical disc by the beam splitter 103, and focused onto the optical disc by the collimator lens 104 to form beam spots, and reflected again from the optical disc. The reflected beams from optical disc transmit through the beam splitter 103, and are collected by the objective lens 105 and detected by the photo detector 106.

As illustrated in FIG. 2, an 8-split light receiving element composed of eight discrete photoelectric terminals A, B, C, D, E1, E2, F1, F2 is used as the photo detector 106. Four split terminals at the center A, B, C, D belongs to a main beam spot portion 106a receiving a reflected ray of the main beam, and the other four split terminals E1, E2, F1, F2 on both sides of the main beam spot portion 106a belong to a sub beam spot portion 106b. The number and the position of the terminals of the main beam spot portion 106a and the sub beam spot portion 106b can be varied depending on a desired product design.

The photo detector 106 detects a main beam that is focused on the main beam spot portion 106a, and reads information stored in the beam and detects a focusing signal error of the optical disc. Further, the photo detector 106 detects a tracking signal error of the optical disc using the sub beam focused on the sub beam spot portion 106b.

However, laser wavelengths outputted from the LD 101 are different depending on which kind of discs is used. If the optical system is adjusted to one of those wavelengths, the sub beam is not properly incident on the sub beam spot portion 106*b* of the photo detector 106 as shown in FIG. 3. To prevent this, the optical pickup apparatus is now designed to have the diffraction angle or the rotation angle of the diffraction grating 102 change adaptively to the kind of disc used. When the rotation angle of the diffraction grating 102 is changed, the deviation of the sub beam from its incidence path to the photo detector 106 is negligible because the range of the rotation angle is not greater than 5 degrees. However, when the diffraction angle is changed, the degree of deviation of the sub beam varies according to the wavelengths of the lasers used. In order to receive incident sub beams deviated from their incidence path, some suggested to form a plurality of sub beam spot portions 106*b* at every place the sub beams incide. However, this only complicated the structure of the photo detector 106. In this case, as shown in FIG. 3, more than one sub beam having different wavelengths overlap with each other. Thus, it is very hard to determine proper placement for the sub beam spot portions 106*b* to receive all sub beams having different wavelengths.

Even though there are optical pickup apparatuses compatible with DVDs and CDs, they do have several problems to be solved. Recent technical advances in the compact disc industry have brought a BD (Blue ray Disc) with a capacity of 25 G bytes, and there is a very high possibility that new discs with different specifications and greater capacities may be developed in the near future. Unfortunately, the aforementioned methods are for CDs and DVDs with existing specifications. Accordingly, there stands a need to redesign an optical system for reproducing information from those discs of newly developed specifications, or to develop a new optical system for reproducing information from those newly developed discs.

As such, there is a need to develop an optical pickup apparatus compatible with CDs and DVDs and other discs having different specifications that might be developed in the near future.

SUMMARY OF THE INVENTION

Additional aspects and/or advantages of the invention will be set forth in part in the description which follows and, in part, will be apparent from the description, or may be learned by practice of the invention.

It is, therefore, an object of the present invention to provide an optical pickup apparatus capable of recording and/or reproducing information onto and/or from discs having diverse specifications, by adjusting a refractive index of sub beams incident on a light receiving element to ensure that the sub beams are not deviated from their incidence path to the light receiving element.

To achieve the above objects and advantages, there is provided an optical pickup apparatus including a laser diode for emitting two light beams of different wavelengths, a diffraction grating for splitting a laser beam from the LD into three discrete beams, namely one main beam and two sub beams, a beam splitter for reflecting a beam off of the diffraction grating towards an optical disc and transmitting a reflected beam from the optical disc, an objective lens for condensing the reflected light transmitted through the beam splitter, and a photo detector for photoelectrically transforming three (one main beam and two sub beams) beam spots condensed by the objective lens into electric signals. The photo detector includes: a substrate for transmitting three beams (one main beam and two sub beams) reflected from the optical disc; a liquid crystal for refracting the two sub beams, that are transmitted through the substrate, at different refractive indexes according to the wavelength of a laser beam outputted from the laser diode; an electrode material for supplying power to the liquid crystal; a switch for adjusting the magnitude of an applied voltage to the electrode material; and a light receiving element on which the main beam and the refracted sub beams while transmitting the substrate and the liquid crystal are projected and transformed into electric signals.

In an exemplary embodiment of the present invention, the substrate is made of light transmitting materials including glass and plastic, and forms an upper or lower hemisphere in which the spherical surface of the substrate that faces the liquid crystal is concaved or convexed to accommodate the liquid crystal, and the two sub beams passing through the spherical surface are refracted.

In an exemplary embodiment of the present invention, the switch adjusts the magnitude of the voltage supplied to the liquid crystal according to the wavelength of a laser beam outputted from the laser diode, and the alignment angle of liquid crystal molecules is changed depending on the magnitude of the voltage, whereby the refractive index of the sub beams passing through the liquid crystal is changed.

Preferably, the substrate is made of light transmitting materials including glass and plastic, and a plurality of liquid crystal layers are formed at a predetermined distance from each other, and the electrode material is formed on and beneath the respective liquid crystal layers.

In an exemplary embodiment, the switch supplies power selectively or simultaneously to each electrode material layer.

Preferably, the electrode material is disposed on and beneath the liquid crystal layers, respectively, and bears a specific magnification due to an electrode pattern thereof.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1:
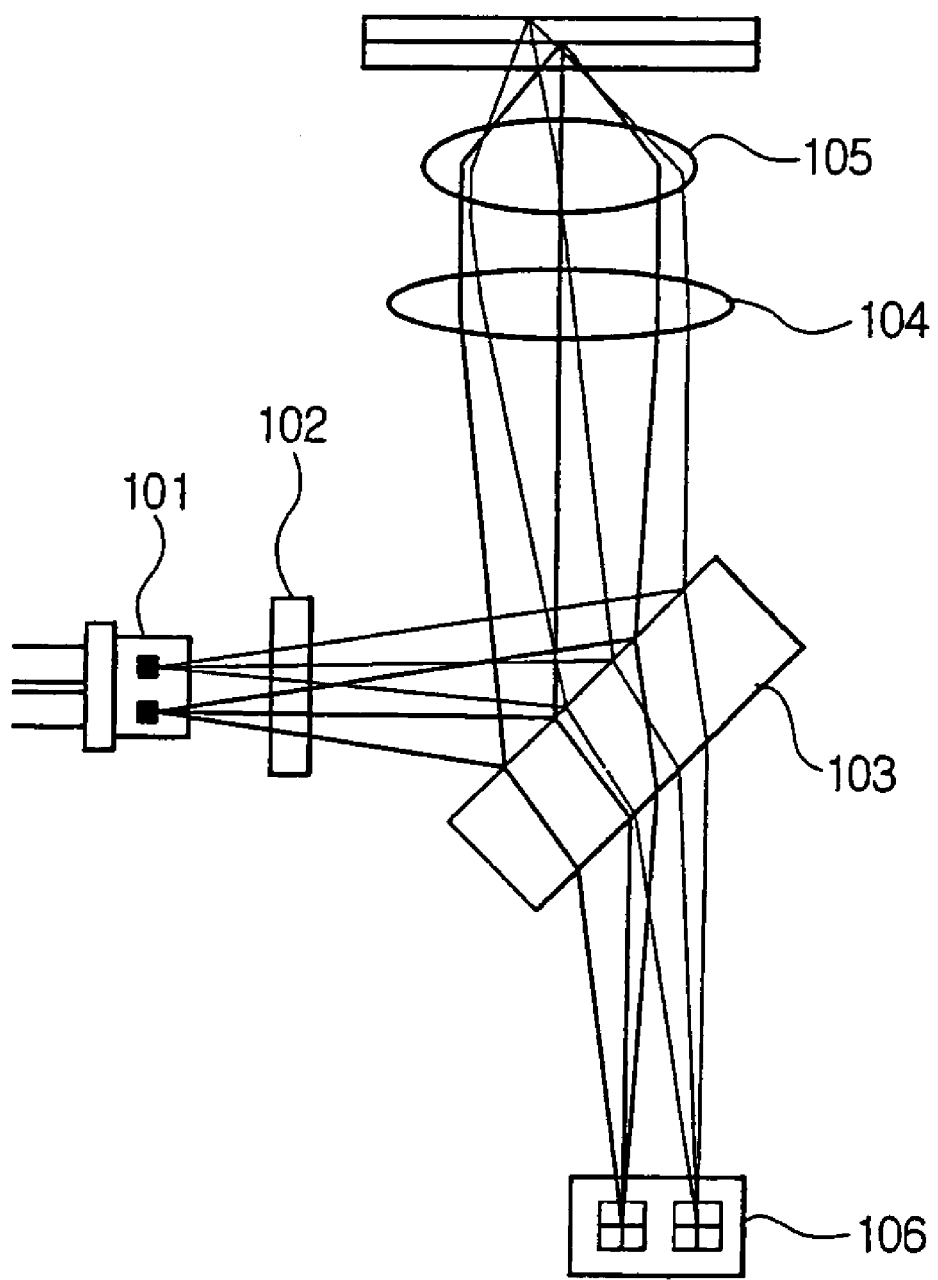
FIG. 1 is a cross-sectional view of a conventional optical pickup apparatus in operation.
Figure 2:
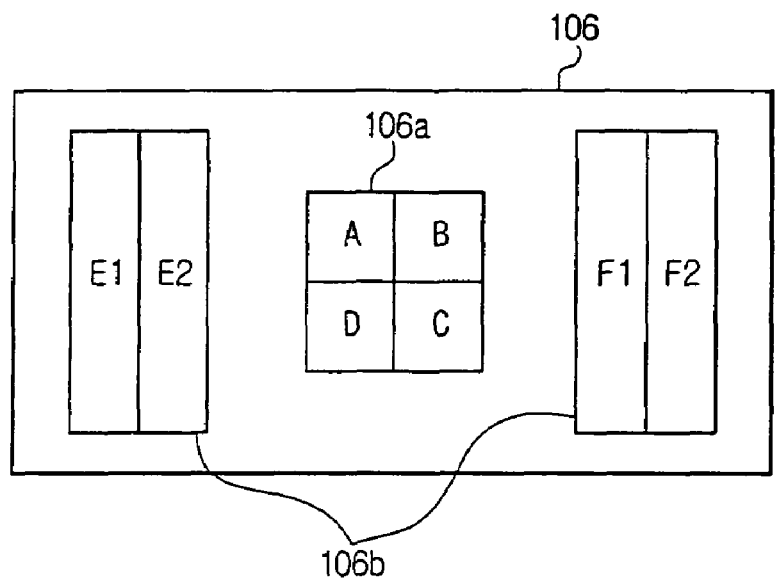
FIG. 2 is a plan view of the photo detector of FIG. 1.
Figure 3:
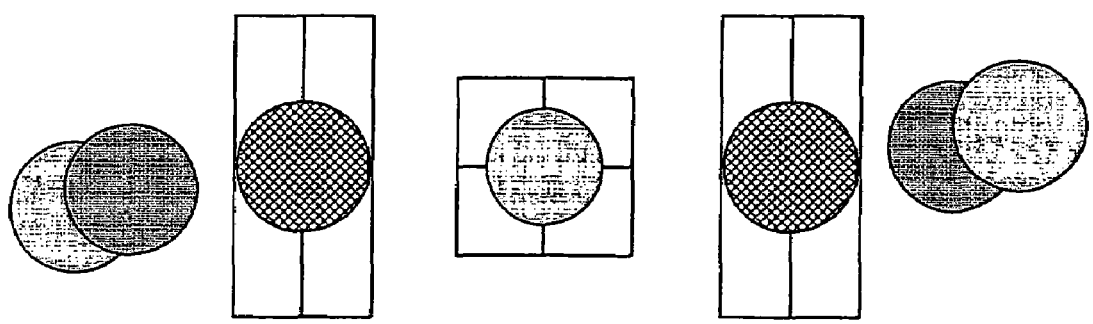
FIG. 3 is a plan view showing a state that sub beams having different wavelengths are incident on the photo detector of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

In general, laser light outputted from a laser diode (LD) of an optical pickup apparatus is split into a main beam and sub beams. The main beam is an $0^{th}$-order beam for reading an information signal and for the focus servo of an optical disc. The sub beams are $\pm 1^{st}$-order beams for the track focus of an optical disc.

Figure 4:
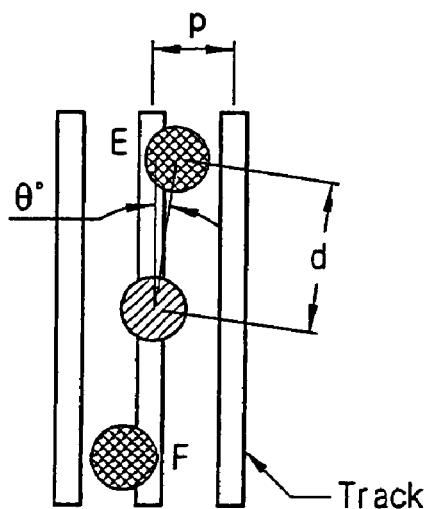
FIG. 4 is a plan view showing a relation between a main beam and a sub beam projected onto an optical disc.

As previously discussed, the beams split through a beam splitter are reflected towards the optical disc, and focused onto the optical disc by a collimator lens. As shown in FIG. 4, the main beam is incident on the central part, and a pair of sub beams E and F are incident on both sides. A straight line connecting each sub beam to the main beam and the track of the optical disc are at an angle of θ. At this time, a distance, d, between the main beam and each of the sub beam can be calculated by the following equation.

$$d = \frac{1}{m} * L_{LDtoGT} * \frac{\lambda}{p} \quad \text{[Equation 1]}$$

wherein, m indicates a magnification of a laser diode; $L_{LDtoGT}$ indicates a beam path from the laser diode to a diffraction grating plane; λ indicates a wavelength; and p indicates a grating interval.

When the diffraction angle is adjusted according to the specification of the disc for an optical system whose photosphere has a fixed magnification, the distance between the main beam and each of the sub beams incident on a photo detector, i.e., the distance between the $0^{th}$-order beam and the $\pm 1^{st}$-order beams changes according to the specification of the disc.

In Equation 1, the wavelength (λ) and the grating interval (p) are fixed values. Therefore, if the diffraction grating is a built-in type or is disposed almost at the same position according to the wavelengths, the beam path from the laser diode to the diffraction grating plane remains almost the same irrespective of the wavelengths.

From Equation 1, the distance, $D_{PD}$, between the $0^{th}$-order beam and the $\pm 1^{st}$-order beams incident on the photo detector can be obtained as follows.

$$D_{PD} = M \times d \quad \text{[Equation 2]}$$

wherein, M indicates a light-receiving magnification. Therefore, according to Equation 2, a position on which a sub beam is incident can be adjusted by changing the light-receiving magnification. In other words, by adjusting the light-receiving magnification calculated according to the wavelengths, it becomes possible to make the sub beams of different wavelengths incident on the same position of the light receiving element even when laser beams have different wavelengths.

Figure 5:
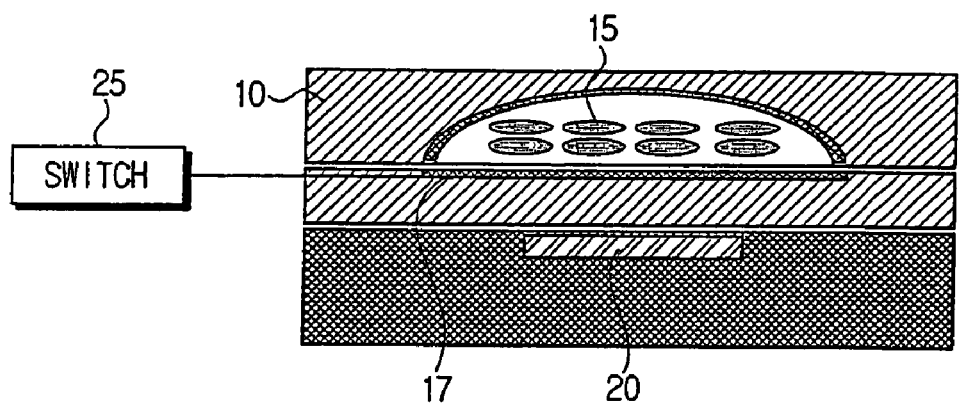
FIG. 5 is a cross-sectional view of a photo detector for use in an optical pickup apparatus according to a first embodiment of the present invention.

As such, the optical pickup apparatus of the present invention is designed in such a manner that the light-receiving magnification of the photo detector can be adjusted. FIG. 5 shows a cross-sectional view of a photo detector for use in the optical pickup apparatus according to the first embodiment of the present invention.

Referring to FIG. 5, the photo detector includes a substrate 10 having at least one curved surface, a liquid crystal 15 having a variable refractive index according to voltage, an ITO (Indium Tin Oxide) 17 acting as an electrode for supplying power to the liquid crystal 15, a photodiode 20 functioning as a light receiving element, and a switch 25 for controlling the magnitude of an applied voltage to the liquid crystal 15 through the ITO 17.

Here, the substrate 10 is made of light transmitting materials such as glass or plastic, and has an upper hemisphere space at the bottom. If viewed from the upper plane on which the main beam and the sub beams are incident, the surface of the substrate 10 is protruded, functioning as a convex lens. Thus, it forms a focal point and a focal length according to its curvature. That is, after transmitting the substrate 10, the main beam and the sub beams are focused into a specific focal point according to wavelength. Here, the longer the wavelength, the longer the focal length. It is also possible to make a concaved surface of the substrate. In such a case, the substrate 10 functions as a concave lens capable of focusing the beams into a specific focal point.

After the main beam and the sub beams transmit through the substrate 10, they transmit through the liquid crystal 15. The alignment of liquid crystal molecules changes when a voltage is applied thereto through the ITO 17, and this brings a change to the refractive index of the liquid crystal. More specifically, when a voltage is applied to the liquid crystal 15 through the ITO 17, the alignment angle of the liquid crystal molecules are changed. If the alignment angle of the crystal liquids 15 is changed, the sub beams that are refracted while transmitting the substrate 10 are refracted again by the liquid crystal 15. As such, the main beam and the sub beams have changed focal lengths respectively, and this means that the light-receiving magnification for the beams is changed.

For example, before an operating voltage is applied to the liquid crystal 15, the liquid crystal 15 has a predetermined refractive index ($n_1$). However, when the operating voltage is fully applied (100%), the refractive index of the liquid crystal 15 is changed to $n_2$. In that case, the main beam and the sub beams are refracted among the liquid crystal molecules when they transmit through the liquid crystal 15. Therefore, by adjusting the magnitude of the operating voltage applied to the liquid crystal 15, it becomes possible to change the refractive index of the sub beams. Since the $\pm 1^{st}$-order sub beams are incident at an angle on the surface of the substrate 10 of the photo detector, they are refracted according to the refractive index.

Therefore, if the operating voltage applied to the liquid crystal 15 with the shape of a convex lens is set according to wavelength and if refractive index of the sub beams changes according to their wavelengths (i.e., the longer the wavelength of the sub beam, the larger the refractive index; and the shorter the wavelength of the sub beam, the smaller the refractive index), the sub beams having different wavelengths are refracted at different refractive indexes while transmitting through the liquid crystal 15, and eventually arrive at the same position.

The adjustment of an applied voltage to the liquid crystal 15 is performed by the switch 25. In effect, the switch 25 adjusts the applied voltage to ITO 17, according to the specification of a medium which information is recorded on and/or reproduced from. When the applied voltage to the liquid crystal molecules is adjusted, the refractive index is changed and thus the focal length of the sub beam is changed also. In result, it becomes possible to project the sub beam onto a desired position.

According to the photo detector of the present invention, when the applied voltage to the liquid crystal 15 is adjusted according to different wavelengths of laser rays for use in recording and/or reproducing information onto and/or from BDs, CDs, and DVDs (e.g., 104 nm, 650 nm and 780 nm, respectively), the alignment angle of the liquid crystal molecules is changed. Thus, the refractive index of the sub beams incident on the liquid crystal is changed, and the sub beams are eventually incident on the same position. Meanwhile, the substrate 10, the liquid crystal 15, the ITO 17, the switch 25, and the photodiode 20 of the photo detector can be built in as one body or separately. Moreover, an 8-split photodiode is preferably used as the photodiode 20, but other types of photodiode can also be used.

Figure 7A:
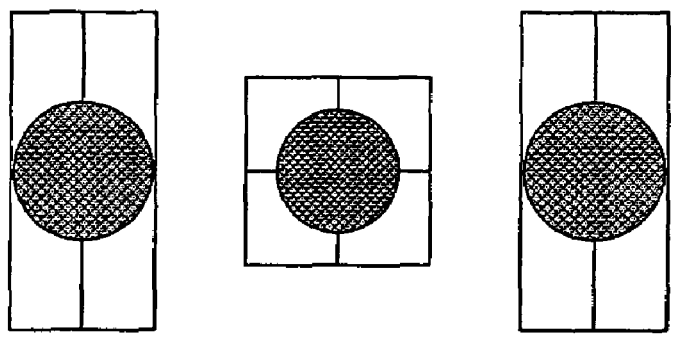
FIG. 7A and FIG. 7B are plan views showing a state that sub beams are incident on a photodiode, to which a photo detector of the present invention is applied.
Figure 7B:
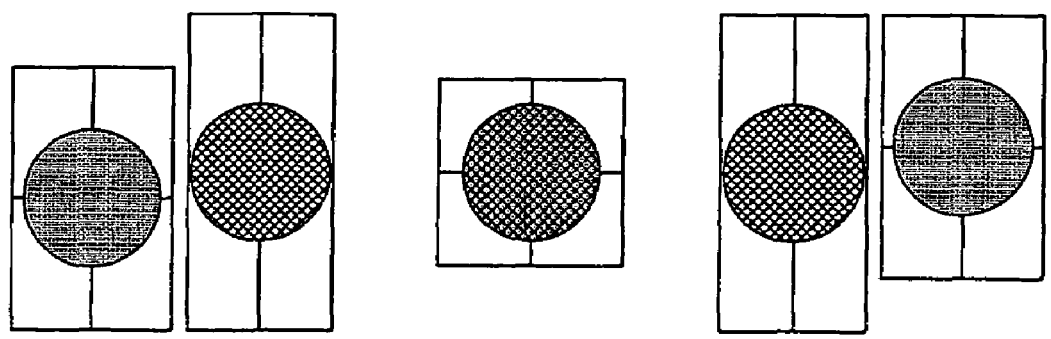

Since the focal length of the sub beams is shifted (or changed) by the change in the refractive index thereof, as shown in FIG. 7 A, all sub beams of laser with different wavelengths are projected onto the same position of the photodiode 20 receiving the ±1$^{st}$-order sub beams. A DVD RAM, on the other hand, adds the ±1$^{st}$-order beams and the 0$^{th}$-order beams, that are generated using a differential astigmatism method, and forms a focal point. Therefore, the DVD RAM requires an additional 4-split photodiode. FIG. 7 B illustrates a plan view of a photo detector including an additional 4-split photodiode for the DVD RAM.

Figure 8:
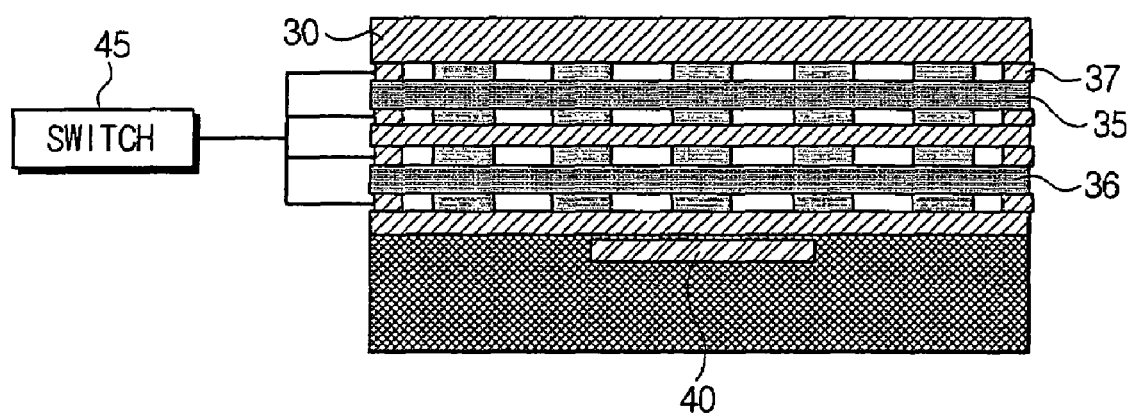
FIG. 8 is a cross-sectional view of a photo detector for use in an optical pickup apparatus according to a second embodiment of the present invention.

FIG. 8 is a cross-sectional view of a photo detector for use in an optical pickup apparatus according to a second embodiment of the present invention. As shown in the drawing, the photo detector includes a substrate 30 made of light transmitting materials such as glass or plastic; first and second liquid crystal layers 35, 36; two pairs of ITO 37, each being disposed on and beneath the liquid crystal layers 35, 36; a photodiode 40 for use in photo detection; and a switch 45 for supplying power selectively or simultaneously to the liquid crystal layers 35, 36.

Figure 6:
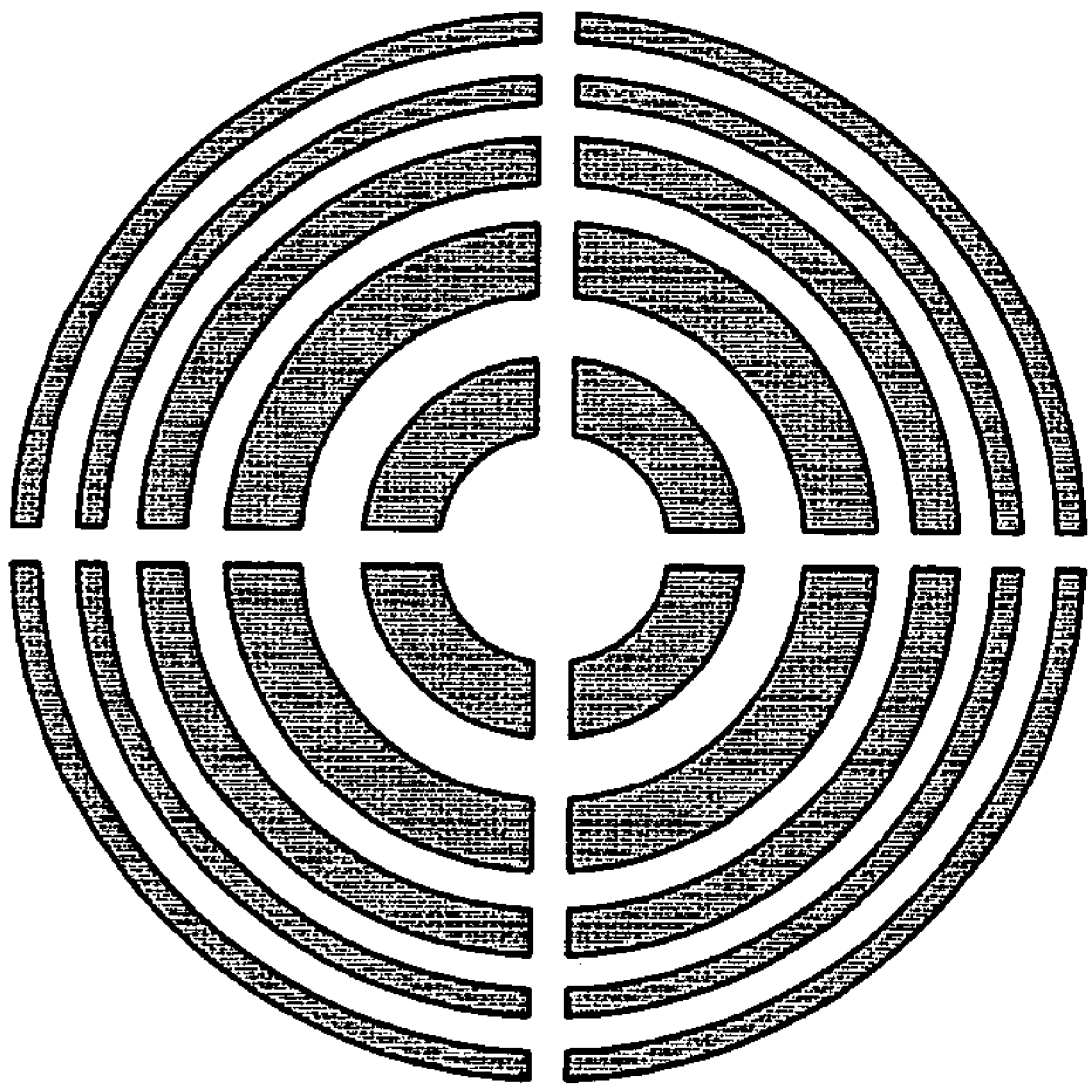
FIG. 6 is a plan view of an electrode pattern of the switch of FIG. 1.

As in the first embodiment of the present invention, the substrate 30 is made of light transmitting materials such as glass or plastic, but it is planar in the second embodiment. The switch 45, as shown in FIG. 6, has a concentric electrode pattern. This electrode pattern is determined by Equation 3 below.

$$r_M = ((M\lambda)^2 + M\lambda f)^{\frac{1}{2}} \quad \text{[Equation 3]}$$

wherein, $r_M$ is an M-th radius, $\lambda$ is a wavelength, and f is a focal length.

Preferably, there are two switches 45 under the substrate 30. The switches 45 for applying a voltage to each of the liquid crystal layers 35, 36 have their own magnification which is determined by the Equation 3, to ensure that the sub beams are incident on a desired position.

In effect, the switches 45 can be built in the photo detector in diverse ways. For instance, if power is not supplied to both liquid crystal layers 35, 36, the switches 45 are designed to form a constant light-receiving magnification. If power is supplied to the first liquid crystal layer 35, the switches 45 are designed to form a first light-receiving magnification, and if power is supplied to the second liquid crystal layer 36, the switches 45 are designed to form a second light-receiving magnification. Lastly, if power is supplied to both liquid crystal layers 35, 36, the switches 45 are designed to form a third light-receiving magnification. Further, the switches 45 can be designed differently taking the kind of wavelengths and the design system of the optical pickup apparatus into consideration.

Table 1 below illustrates one embodiment of the photo detector for use in the optical pickup apparatus according to the present invention.

TABLE 1

|  | BD | DVD RAM | DVD | CD |
| --- | --- | --- | --- | --- |
| Wavelength (nm) | 408 | 658 | 658 | 785 |
| Track pitch (μm) | 0.32 | 1.23 | 0.74 | 1.60 |
| Diffraction grating pitch (μm) | 20 | 20 | 20 | 20 |
| Magnification of laser diode (m) | 9.091 | 8.772 | 8.772 | 8.772 |
| Light-receiving magnification (M) | 18.928 | 11.299 | 11.299 | 9.467 |
| D$_{PD}$ (μm) | 160.000 | 160.000 | 160.000 | 160.000 |

As can be seen in Table 1, wavelengths of lasers used for BD, DVD RAM, DVD, and CD are 408 nm, 658 nm, 658 nm, and 785 nm, respectively, and track pitches thereof are 0.32 μm, 1.23 μm, 0.74 μm, and 1.60 μm, respectively. From the track pitches, one can conclude that the storage capacity of each disc is largest in order of BD, DVD, DVD RAM, and CD (i.e., with the largest one first). The magnifications of the laser diodes for the discs are 9.091, 8.772, 8.772, and 8.772, respectively. Provided that the diffraction grating pitch is set to 20 for all discs and the light-receiving magnifications are set to 18.928, 11.299, 11.299, and 9.467, respectively, to record and/or reproduce information onto and/or from the discs, the distance between the ±1$^{st}$-order beams and the 0$^{th}$-order beam, D$_{PD}$, is 160.000 μm for all. In other words, it is now possible to make all the ±1$^{st}$-order beams with different wavelengths incident on the same position, simply by changing the light-receiving magnification.

Therefore, the photo detector for use in the optical pickup apparatus of the present invention enables the light-receiving magnification to change by installing the substrate 10 or 30 and the crystal layer(s) 15 or 35, 36 in front of the photodiode 20 or 40, and adjusting the magnitude of an applied voltage to the liquid crystal layer(s) 15 or 35, 36 or applying a voltage selectively or simultaneously to the electrode pattern of the switches 45 having different magnifications. In order to incide the sub beams reflected from the disc onto the same position or a desired position, the beams needs to be refracted at a proper refractive index, or an appropriate voltage should be applied to get a specific magnification. In this manner, the ±1$^{st}$-order beams can be projected onto the same position, irrespective of the wavelengths. As such, the optical pickup apparatus of the present invention is capable of recording and/or reproducing information onto and/or from discs having diverse specifications.

In conclusion, the photo detector for use in the optical pickup apparatus of the present invention includes the substrate 10 or 30, the liquid crystal (layers) 15 or 35, 36, and the switch 25 or 45. This simple constitution makes it possible to project the ±1$^{st}$-order beams onto the same position. Overall, the structure of the photo detector and the circuit configuration were much simplified so that the assembly and reliability thereof were improved. As a result, the cost of manufacture can be reduced. Further, the simple design of the optical system can bring a small-sized optical pickup apparatus. The photo detector of the present invention can be applied to all types of optical discs having different wavelengths. In other words, there is no need to develop or design a new photo detector every time an optical disc with a new specification is developed.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical pickup apparatus comprising a laser diode (LD) for emitting two light beams of different wavelengths, a diffraction grating for splitting a laser beam from the LD into three discrete beams, namely one main beam and two sub beams, a beam splitter for reflecting a beam off of the diffraction grating towards an optical disc and transmitting a reflected beam from the optical disc, an objective lens for condensing the reflected light transmitted through the beam splitter, and a photo detector for photoelectrically transforming the one main beam and two sub beam spots condensed by the objective lens into electric signals, wherein the photo detector is comprised of:
 a substrate for transmitting the one main beam and two sub beams reflected from the optical disc;
 a liquid crystal for refracting the two sub beams, that are transmitted through the substrate, at different refractive indexes according to the wavelength of a laser beam outputted from the laser diode;
 an electrode material for supplying power to the liquid crystal;
 a switch for adjusting the magnitude of an applied voltage to the electrode material; and
 a light receiving element on which the main beam and the refracted sub beams while transmitting through the substrate and the liquid crystal are projected and transformed into electric signals.

2. The optical pickup apparatus according to claim 1, wherein the substrate is made of light transmitting materials including glass and plastic, and forms an upper or lower hemisphere in which the spherical surface of the substrate faces the liquid crystal is concaved or convexed to accommodate the liquid crystal, and the two sub beams passing through the spherical surface are refracted.

3. The optical pickup apparatus according to claim 1, wherein the switch adjusts the magnitude of a voltage supplied to the liquid crystal according to the wavelength of a laser beam outputted from the laser diode, and the alignment angle of liquid crystal molecules is changed depending on the magnitude of the voltage, whereby the refractive index of the sub beams passing through the liquid crystal is changed.

4. The optical pickup apparatus according to claim 1, wherein the substrate is made of light transmitting materials including glass and plastic, and a plurality of liquid crystal layers are formed at a predetermined distance from each other, and the electrode material is formed on and beneath the respective liquid crystal layers.

5. The optical pickup apparatus according to claim 4, wherein the switch supplies power selectively or simultaneously to each electrode material layer.

6. The optical pickup apparatus according to claim 5, wherein the electrode material is disposed on and beneath the liquid crystal layers, respectively, and bears a specific magnification due to an electrode pattern thereof.

7. The optical pickup apparatus according to claim 1, wherein the electrode material is indium tin oxide.

8. The optical pickup apparatus according to claim 1, wherein the substrate, the liquid crystal, the electrode material and the light receiving element are built in one body.

9. The optical pickup apparatus according to claim 1, wherein the light receiving element is an 8-split photo diode.

10. The optical pickup apparatus according to claim 1, wherein the photodetector further comprises a second switch for adjusting the magnitude of an applied voltage to the electrode material.

11. An optical pickup device for use with an optical disc comprising:
 a laser diode for emitting two light beams of different wavelengths;
 a diffraction grating for splitting a laser beam from the laser diode into a main beam and two sub beams;
 a beam splitter for reflecting a beam off of the diffraction grating towards the optical disc and transmitting a reflected beam from the optical disc;
 an objective lens for condensing the reflected light transmitted through the beam splitter; and
 a photo detector for photoelectrically transforming the main beam and the two sub beams spots condensed by the objective lens into electric signals,
 wherein the photo detector comprises:
  a substrate for transmitting the main beam and the two sub beams reflected from the optical disc;
  a liquid crystal for refracting the two sub beams transmitted through the substrate at different refractive indexes according to the wavelength of a laser beam outputted from the laser diode;
  an electrode material for supplying power to the liquid crystal;
  a switch for adjusting the magnitude of an applied voltage to the electrode material; and
  a light receiving element on which the main beam and the refracted sub beams while transmitting through the substrate and the liquid crystal are projected and transformed into electric signals.

12. The optical pickup device according to claim 11, wherein the substrate is configured to form a hemisphere in which a spherical surface of the substrate accommodates the liquid crystal, and the two sub beams passing through the spherical surface are refracted.

13. The optical pickup device according to claim 11, wherein the switch adjusts the magnitude of a voltage supplied to the liquid crystal according to the wavelength of a laser beam outputted from the laser diode.

14. The optical pickup device according to claim 11, wherein the substrate is translucent and comprises:
 a plurality of liquid crystal layers formed at a predetermined distance from each other; and
 a plurality of electrode material layers formed on and beneath each liquid crystal layer.

15. The optical pickup device according to claim 14, wherein the switch supplies power selectively or simultaneously to each electrode material layer.

16. The optical pickup device according to claim 15, wherein each electrode material layer bears a specific magnification due to an electrode pattern thereof.

17. The optical pickup device according to claim 11, wherein the electrode material is indium tin oxide.

18. The optical pickup device according to claim 11, wherein the substrate, the liquid crystal, the electrode material and the light receiving element are built in one body.

19. The optical pickup device according to claim 11, wherein the light receiving element is an 8-split photo diode.

20. The optical pickup device according to claim 11, wherein the photodetector further comprises a second switch for adjusting the magnitude of an applied voltage to the electrode material.

* * * * *